United States Patent [19]

Omnes

[11] Patent Number: 4,974,671

[45] Date of Patent: Dec. 4, 1990

[54] DOWN-HOLE SEISMIC SOURCE WITH CONTAINMENT

[75] Inventor: Gildas Omnes, L'Haye Les Roses, France

[73] Assignee: Compagnie Generale de Geophysique, Massy Cedex, France

[21] Appl. No.: 376,985

[22] Filed: Jul. 7, 1989

[30] Foreign Application Priority Data

Jul. 11, 1988 [FR] France .................. 88 09392

[51] Int. Cl.$^5$ ............................ F42D 1/02
[52] U.S. Cl. ........................ 166/55.1; 102/314
[58] Field of Search ............. 89/1.15; 102/314, 322; 166/55.1; 175/2

[56] References Cited

U.S. PATENT DOCUMENTS 2,609,885  9/1952  Silverman .
3,150,590  9/1964  Silverman ................ 102/21.6
3,289,583  12/1966  Silverman ................ 102/20
4,081,031  3/1978  Mohaupt ................ 166/299
4,090,447  5/1978  Johnsen ................ 102/314 X

FOREIGN PATENT DOCUMENTS 0577526  6/1959  Canada ................ 102/314
663864  5/1963  Canada ................ 102/314

Primary Examiner—William P. Neuder
Attorney, Agent, or Firm—Blakely, Sokoloff, Taylor & Zafman

[57] ABSTRACT

The invention relates to a down-hole seismic source with containment. The seismic source comprises a source body (1) supporting an explosive test charge (SE). The source body (1) is constituted by a hollow cylinder and the outside surface of the cylinder includes a containment housing (2) in which the explosive source (SE) is received. The invention is applicable to down-hole seismic sources.

7 Claims, 2 Drawing Sheets a)

b)

DOWN-HOLE EXPLOSIVE SOURCE   Effect of containment
(same amplitude scale)

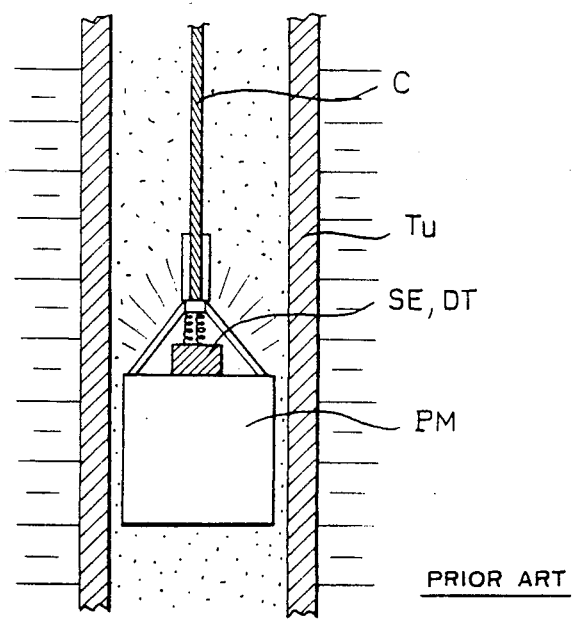
FIG_1 PRIOR ART
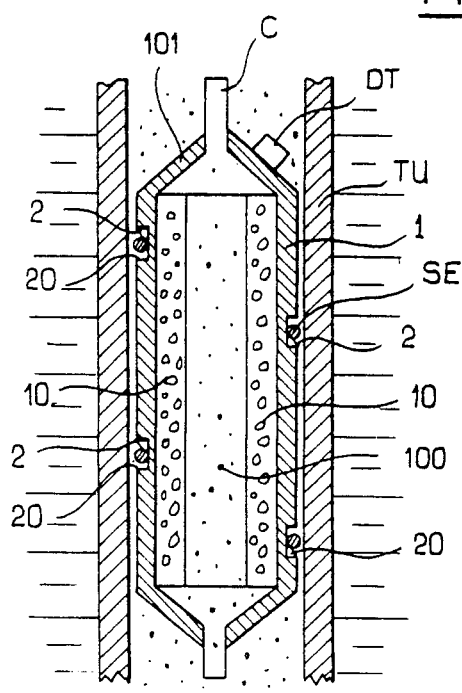
FIG_2
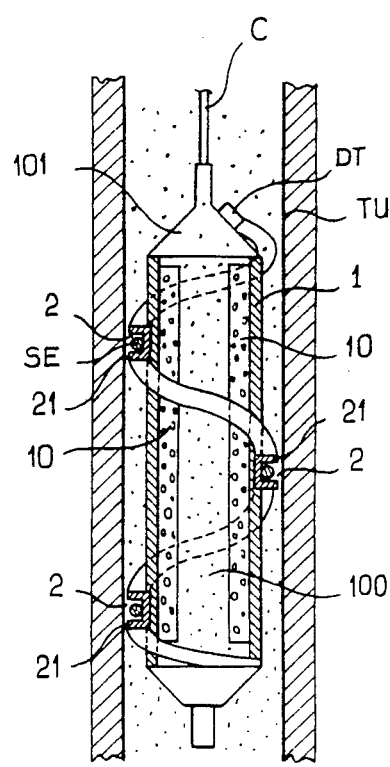
FIG_3

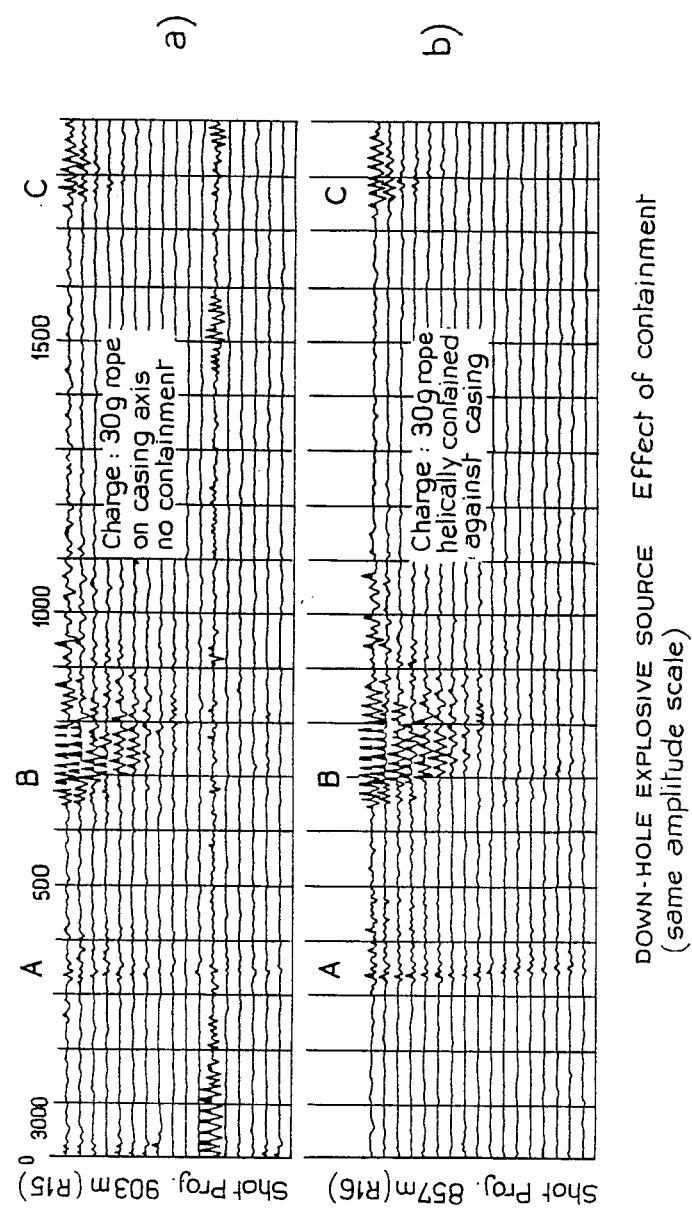

DOWN-HOLE SEISMIC SOURCE WITH CONTAINMENT

The present invention relates to a down-hole seismic source with containment.

BACKGROUND OF THE INVENTION

The down-hole seismic explosive sources currently in use, as shown diagrammatically in FIG. 1, generally comprise a metal part PM terminating a cable linked to the source and used for inserting it into the borehole. An explosive charge SE is disposed on the metal part and is connected to a detonator which is itself connected to ignition control circuits via electrical conductors contained in the connecting cable which constitutes a logging cable.

Thus, for a borehole of given section, the explosion of the explosive charge CE takes place in the liquid medium constituted by drilling mud. The mechanical energy dissipated by the explosion in the fluid filling the upper portion of the borehole is not negligible, and consequently there is a corresponding reduction in the mechanical energy which exerts pressure normal to the wall of the borehole, regardless of whether the borehole is lined with casing TU or not. The diameter of a bubble created in a liquid by an explosion falls off with increasing pressure and is inversely proportional to the cube root of the hydrostatic pressure which, in the above-mentioned conventional situation, is the pressure existing at the depth at which the source is used. The coupling of the mechanical energy released by the explosion to the side walls of the borehole and enabling said mechanical energy to be transferred normally to the walls of the borehole and thence into the adjacent geological strata under investigation, therefore falls off with source depth, which is highly inconvenient when performing successive tests down a single borehole.

The object of the present invention is to remedy the above-mentioned drawback by providing a down-hole seismic source with containment.

SUMMARY OF THE INVENTION

According to a particularly advantageous characteristic of the invention, the explosive charge of the down-hole seismic source of the invention is held close to the wall of the well, thereby maximizing the mechanical coupling of the explosion caused by the explosive charge with the wall of the borehole, practically independently of the depth at which the source is exploded.

The down-hole seismic source of the present invention comprises a source body supporting an explosive test charge. It is remarkable in that the source body is formed by a hollow cylinder which has a containment housing on its outside surface in which the explosive source is inserted.

The down-hole seismic source of the present invention is applicable to down-hole seismic testing regardless of whether the borehole has casing or not.

BRIEF DESCRIPTION OF THE DRAWINGS

The invention will be better understood from reading the following description made with reference to the accompanying drawings, in which:

FIG. 1 is a diagrammatic longitudinal section through a prior art seismic source;

FIG. 2 is a longitudinal section through a first embodiment of a seismic source in accordance with the present invention;

FIG. 3 is a longitudinal section through a second embodiment of a seismic source in accordance with the present invention; and FIG. 4 comprises two plots (a) and (b) showing the amplitude of the detected echo, respectively when there is no containment and when there is containment.

DETAILED DESCRIPTION

The down-hole seismic source with containment of the invention is initially described with reference to FIG. 2.

As can be seen in FIG. 2, the down-hole seismic source of the invention comprises a source body 1 supporting an explosive test source referenced SE. The source body 1 is constituted by a hollow cylinder whose outside surface includes a containment housing 2 in which the explosive source or charge SE is inserted The containment housing 2 is constituted by one or more grooves referenced 20 and formed in the side wall of the source body 1. The explosive source SE is inserted in the containment housing 2.

Advantageously, the source body 1 has an outside diameter which is close to the diameter of the borehole. Naturally, the borehole diameter to be taken into consideration is the inside diameter in the borehole which extends either to the rock if there is no casing or else to the casing TU if casing is present.

The source body 1 may thus be constituted by a hollow metal cylinder having grooves 20 formed in its side surface. In general, the metal cylinder forming the source body 1 may be a few meters long and the grooves 20 may be constituted by helical grooves going round the side surface of the source body 1. Advantageously, the grooves 20 may be a few centimeters deep, so as to constitute a housing for the explosive source SE.

In this case, the explosive source SE is constituted by explosive rope which is engaged in the above-mentioned grooves 20. The explosive rope may advantageously be constituted by RDX type explosive as is conventionally used in drilling. It is then preferable for the grooves 20 to be dimensioned so that their width in the longitudinal direction of the source body 1 is suitable for receiving the explosive rope constituting the explosive source SE within the groove.

Naturally, the explosive source SE is connected to the detonator DT which is itself connected via logging cable C to electric firing circuits via the conductors contained in the logging cable C.

By way of non-limiting example, the diameter of this outside surface of the source body 1 is selected so that said outside surface is at a distance of about 1 centimeter from the wall of the casing TU or from the wall of the borehole if there is no casing. Thus, when the detonator DT is excited by the firing circuits the explosion propagates along the explosive rope SE which is spirally wound around the outside surface of the source body 1, with said explosion propagating at a speed of 6000 meters per second (m/s) along the explosive rope. A shock wave is thus created level with the explosion and by virtue of the containment created by the grooves 20 formed in the outside surface of the source body 1, this shock wave is transmitted transversely to the walls of the borehole or the casing TU and to the adjacent geological strata to be investigated, with the loss of mechanical energy due to the shock wave being transmitted in the longitudinal direction of the source body 1 thus being minimized.

Another particularly advantageous embodiment of the downhole seismic source with containment of the invention is described with reference to FIG. 3. In FIG. 3, the containment housing 2 is constituted by the channel(s) in one or more channel section members 21. The section member(s) 21 is/are applied to the outside surface of the source body 1, with the channels being open towards the outside of the hollow cylinder constituting the source body 1. The explosive source SE is explosive rope inserted in the channel(s) of the section member(s) 21 in a manner analogous to the embodiment described above with reference to FIG. 2.

Naturally, the channel section members 21 are disposed helically around the outside surface of the source body 1 like the grooves 20. The helical disposition of the grooves or channels containing the explosive provides two advantages: firstly it prevents the source being thrown against the wall by reaction; and secondly it increases the charge density per unit length of borehole and this is advantageous since in order to protect the integrity of the cementing present behind the casing, it may be necessary to use an explosive rope of low linear density.

As also shown in FIGS. 2 and 3, the inside of the hollow cylinder constituting the source body 1 is advantageously provided with a lining 10 of composite material. The composite material used may be constituted by polyurethane foam, for example. As shown in FIGS. 2 and 3, the lining 10 leaves an empty central passage 100 which allows the drilling fluid to pass through the sonde while it is being maneuvered, thereby facilitating manipulation thereof by means of a logging cable for the purpose of pulling the sonde and controlling the detonator DT as described above.

In a particularly advantageous embodiment, the source body 1 and the channel section members 21 may be made of steel sheet. When the grooves are constituted by channel section members 21, these members are applied to the side wall of the source body 1 and are fixed thereto by welding. Naturally, in this embodiment, the outside diameter of the source body 1 when provided with its channel section members 21 is selected so that the outwardly directed free ends of the channel section flanges are about 1 centimeter away from the casing TU or from the wall of the borehole.

As also shown in FIGS. 2 and 3, the source body 1 has a cable-anchor member 101 for anchoring the logging cable C enabling the source to be inserted in the borehole. The anchor member 101 supports the detonator DT which is coupled to the explosive charge SE.

Comparative tests between a conventional type of down-hole seismic source and a down-hole seismic source with containment in accordance with the present invention have been performed, and the corresponding results are shown in parts (a) and (b) of FIG. 4.

FIG. 4a shows the amplitude of the echo detected after the explosive source SE has exploded without containment, whereas FIG. 4b shows a comparable test made using a downhole seismic source with containment in accordance with the present invention In both cases, the explosive source SE was constituted by an explosive charge comprising 30 grams of explosive rope, with the explosive rope merely extending along the axis of the borehole casing TU for the tests shown in FIG. 4a, whereas for the tests shown in FIG. 4b, the explosive rope was placed in grooves 20 or in the channel of a channel section member 21 constituting a containment source in accordance with the present invention and as shown in FIGS. 2 and 3. It may be observed that the useful signal amplitude in zone A of FIG. 4b is clearly reinforced by using a down-hole seismic source with containment in accordance with the present invention.

I claim:

1. A down-hole seismic source comprising a source body supporting an explosive test charge, said source body being constituted by a hollow cylinder, said cylinder having a containment housing on its outside surface, and said explosive source being inserted in said containment housing which is constituted by one or more channel section members applied to the outside surface of the source body, with the open channels of the section members being directed outwardly from the hollow cylinder, and with the explosive source being inserted in the channel, and the inside of said hollow cylinder constituting said source body being lined with composite material, said lining leaving an empty central passage.

2. A down-hole seismic source according to claim 1, wherein the source body has an outside diameter close to the inside diameter of the borehole.

3. A seismic source according to claim 1, wherein the channel section members are disposed helically on the side surface of said source body.

4. A seismic source according to claim 1, wherein the explosive charge is constituted by an explosive rope which is inserted in said channel.

5. A seismic source according to claim 1, wherein the source body is made of steel sheet.

6. A seismic source according to claim 1, wherein the source body has an anchor member at one of its ends for connection to the cable, whereby said source is inserted into a borehole, said anchor member supporting a detonator which is coupled to said explosive charge.

7. A seismic source according to claim 1, wherein the channel section members are made of steel sheet.

* * * * *